US008676573B2

(12) United States Patent  (10) Patent No.: US 8,676,573 B2
Sun et al.  (45) Date of Patent: *Mar. 18, 2014

(54) ERROR CONCEALMENT

(75) Inventors: Xuejing Sun, Rochester Hills, MI (US); Kuan-Chieh Yen, Northville, MI (US)

(73) Assignee: Cambridge Silicon Radio Limited, Cambridge (GB)

( * ) Notice: Subject to any disclaimer, the term of this patent is extended or adjusted under 35 U.S.C. 154(b) by 996 days.

This patent is subject to a terminal disclaimer.

(21) Appl. No.: 12/414,546

(22) Filed: Mar. 30, 2009

(65) Prior Publication Data

US 2010/0251051 A1   Sep. 30, 2010

(51) Int. Cl.
   *G10L 21/00* (2013.01)
(52) U.S. Cl.
   USPC ........... 704/207; 704/500; 704/501; 704/502; 704/503; 704/504
(58) Field of Classification Search
   None
   See application file for complete search history.

(56) References Cited

U.S. PATENT DOCUMENTS

| | | | |
|---|---|---|---|
| 4,792,953 A | 12/1988 | Pasdera et al. | |
| 5,142,537 A | 8/1992 | Kutner et al. | |
| 5,799,039 A | 8/1998 | Laird et al. | |
| 7,155,654 B2 | 12/2006 | Chien et al. | |
| 7,206,986 B2 | 4/2007 | Stemerdink et al. | |
| 7,233,897 B2 * | 6/2007 | Kapilow | 704/229 |
| 7,409,338 B1 | 8/2008 | Nien | |
| 7,529,673 B2 | 5/2009 | Makinen et al. | |
| 8,316,267 B2 | 11/2012 | Sun et al. | |
| 2003/0055631 A1 | 3/2003 | Chen | |
| 2003/0078769 A1* | 4/2003 | Chen | 704/211 |
| 2003/0093746 A1* | 5/2003 | Kang et al. | 714/774 |
| 2003/0220787 A1* | 11/2003 | Svensson et al. | 704/207 |
| 2005/0050407 A1* | 3/2005 | El-Maleh et al. | 714/704 |
| 2006/0088093 A1* | 4/2006 | Lakaniemi et al. | 375/240.01 |
| 2006/0182091 A1* | 8/2006 | Park et al. | 370/352 |
| 2007/0198254 A1* | 8/2007 | Goto et al. | 704/226 |
| 2007/0239462 A1* | 10/2007 | Makinen et al. | 704/500 |
| 2008/0027710 A1* | 1/2008 | Jacobs et al. | 704/201 |

(Continued)

FOREIGN PATENT DOCUMENTS

WO   0193488 A1   12/2001

OTHER PUBLICATIONS

C. Perkins et al. "A Survey of Packet Loss Recovery Techniques for Streaming Audio," IEEE Network Magazine, Sep./Oct. 1998.

(Continued)

*Primary Examiner* — Leonard Saint Cyr
(74) *Attorney, Agent, or Firm* — Frommer Lawrence & Haug LLP; John W. Branch

(57) ABSTRACT

A method and apparatus for decoding portions of a data stream, wherein each portion comprises a plurality of samples. The method comprises storing portions of the data stream, decoding portions of the data stream to form decoded portions, and storing the decoded portions. The method further comprises identifying that a portion of the data stream is degraded. Following identifying that a portion of the data stream is degraded, the method generates a decoded portion for the degraded portion of the data stream using the stored decoded portions. The method also updates a state of a decoder by: estimating a pitch period of the degraded portion; selecting a group of successive samples of the stored portions of the data stream, the group of successive samples offset from the degraded portion in the data stream by a multiple of the estimated pitch period; and decoding the selected samples at the decoder.

14 Claims, 6 Drawing Sheets

(56) References Cited

U.S. PATENT DOCUMENTS

| | | | |
|---|---|---|---|
| 2008/0046237 A1 | 2/2008 | Zopf et al. | |
| 2008/0046249 A1 | 2/2008 | Thyssen et al. | |
| 2008/0235554 A1 | 9/2008 | Simmons et al. | |
| 2009/0281797 A1 | 11/2009 | Zopf et al. | |
| 2010/0185441 A1 | 7/2010 | Sun et al. | |
| 2010/0281321 A1 | 11/2010 | Sun et al. | |
| 2010/0324911 A1* | 12/2010 | Jougit et al. | 704/500 |
| 2012/0014434 A1 | 1/2012 | Hong et al. | |
| 2013/0159805 A1 | 6/2013 | Sun et al. | |

OTHER PUBLICATIONS

ITU-T Recommendation G.711 Appendix I, "A high quality low-complexity algorithm for packet loss concealment with G.711," 1999.

B. Kovesi et al. "A Low Complexity Packet Loss Concealment Algorithm for ITU-T G.722," ICASSP 2008, pp. 4769-4772.

Abandoned U.S. Appl. No. 12/356,631, filed Jan. 21, 2009, Title: Error Concealment, Inventor: Xuejing Sun and Kuan-Chieh Yen.

Pending U.S. Appl. No. 12/359,036, filed Jan. 23, 2009, Title: Error Concealment, Inventor: Xuejing Sun and Kuan-Chieh Yen.

Official Communication in U.S. Appl. No. 13/682,073 mailed May 2, 2013.

Cheetham et al., Error Concealment for Voice over WLAN in Converged Enterprise Networks, 15th IST Mobile & Wireless Communications Summit 2006, Mykonos, Jun. 4-8, 2006.

Fingscheidt et al., Softbit Speech Decoding: A New Approach to Error Concealment, IEEE Transaction on Speech and Audio Processing, vol. 9, No. 3, Mar. 2001, pp. 240-251.

Official Communication in U.S. Appl. No. 12/359,036 mailed Feb. 1, 2012.

Official Communication in U.S. Appl. No. 12/434,449 mailed Jul. 19, 2012.

Official Communication in U.S. Appl. No. 12/434,449 mailed May 21, 2012.

Official Communication in U.S. Appl. No. 12/359,036 mailed Sep. 20, 2012.

Official Communication in U.S. Appl. No. 12/359,036 mailed Jun. 27, 2012.

* cited by examiner

ERROR CONCEALMENT

FIELD OF THE DISCLOSURE

This disclosure relates to decoding a data stream. The present disclosure is particularly applicable to decoding a data stream comprising degraded portions, and to updating a state of a decoder following identification that a portion of the data stream is degraded.

BACKGROUND

Wireless and voice-over-internet protocol (VoIP) communications are subject to frequent degradation of packets as a result of adverse connection conditions. The degraded packets may be lost or corrupted (comprise an unacceptably high error rate). Such degraded packets result in clicks and pops or other artefacts being present in the output voice signal at the receiving end of the connection. This degrades the perceived speech quality at the receiving end and may render the speech unrecognizable if the packet degradation rate is sufficiently high.

Broadly speaking, two approaches are taken to combat the problem of degraded packets. The first approach is the use of transmitter-based recovery techniques. Such techniques include retransmission of degraded packets, interleaving the contents of several packets to disperse the effect of packet degradation, and addition of error correction coding bits to the transmitted packets such that degraded packets can be reconstructed at the receiver. In order to limit the increased bandwidth requirements and delays inherent in these techniques, they are often employed such that degraded packets can be recovered if the packet degradation rate is low, but not all degraded packets can be recovered if the packet degradation rate is high. Additionally, some transmitters may not have the capacity to implement transmitter-based recovery techniques.

The second approach taken to combating the problem of degraded packets is the use of receiver-based concealment techniques. Such techniques are generally used in addition to transmitter-based recovery techniques to conceal any remaining degradation left after the transmitter-based recovery techniques have been employed. Additionally, they may be used in isolation if the transmitter is incapable of implementing transmitter-based recovery techniques. Low complexity receiver-based concealment techniques such as filling in a degraded packet with silence, noise, or a repetition of the previous packet are used, but result in a poor quality output voice signal. Regeneration based schemes such as model-based recovery (in which speech on either side of the degraded packet is modeled to generate speech for the degraded packet) produce a very high quality output voice signal but are highly complex, consume high levels of power and are expensive to implement. In practical situations interpolation-based techniques are preferred. These techniques generate a replacement packet by interpolating parameters from the packets on one or both sides of the degraded packet. These techniques are relatively simple to implement and produce an output voice signal of reasonably high quality.

Pitch based waveform substitution is a preferred interpolation-based packet degradation recovery technique. Voice signals appear to be composed of a repeating segment when viewed over short time intervals. This segment repeats periodically with a time period referred to as a pitch period. In pitch based waveform substitution, the pitch period of the voiced packets on one or both sides of the degraded packet is estimated. A waveform of the estimated pitch period is then repeated and used as a substitute for the degraded packet. This technique is effective because the pitch period of the degraded voice packet will normally be substantially the same as the pitch period of the voice packets on either side of the degraded packet.

Waveform substitution can be a very effective packet degradation concealment method for simple coding schemes that do not require use of a memory in order to decode a data stream, for example pulse code modulation (PCM). However, waveform substitution as it is described above is unable to fully address packet degradation problems in some codecs that rely on properties of the decoder in addition to the received data stream in order to decode the data stream. In particular, it is unable to fully address packet degradation problems in codecs that use an internal state held by the decoder after it has decoded a packet of data in order to decode the next packet of data, in addition to using the encoded data in the next packet of data. Examples of such codecs are continuously variable slope delta modulation (CVSD) and adaptive delta pulse code modulation (AD-PCM).

If the decoder is used to decode a degraded packet that has been encoded using such a codec, then the decoder generates an erroneous output that does not correspond to the packet prior to its being encoded at the transmitting end of the connection. Additionally, the decoder is left holding an internal state that is dependent on the degraded packet. This internal state is not the correct state for decoding the next packet of data. Consequently the next packet, even if received in an adequate condition, is incorrectly decoded by the decoder. If a packet concealment method is used to generate a decoded output for the degraded packet then the decoded output is not erroneous. However if a packet concealment method is used then the decoder may not need be used. If the decoder is not used then the internal state of the decoder is not updated to the state required to decode the next packet of data. Consequently the next packet, even if received in an adequate condition, is incorrectly decoded by the decoder. The error in the decoder state propagates through subsequent decoding steps. Subsequent packets are therefore additionally incorrectly decoded as a result of the propagation of the error in the decoder state.

If the decoder holds incorrect internal states when it decodes data packets, undesirable artefacts result in the output voice signal. These artefacts cannot easily be removed by conventional waveform domain packet loss concealment algorithms. Updating the decoder state to the correct decoder state for the next data packet to be decoded is therefore important for providing an acceptable quality output voice signal.

Several approaches have been taken to solve the problem of updating the internal state of the decoder when a degraded packet has been received.

U.S. Pat. No. 7,206,986 discloses a packet concealment method that inherently updates the state of the decoder. The apparatus of this patent is depicted in FIG. 1. Received encoded data on line 101 is checked for errors at block 102. If an error is indicated then the switch 103 connects input 104 to output 105. The switch output 105 is connected to CVSD decoder 106. The switch output 105 is also connected to buffer 107. The buffer 107 stores encoded data that is output by the switch to the decoder 106. If an error is detected by block 102 then the pitch period of the data decoded prior to the error is estimated at block 108. The encoded data in buffer 107 is looped to the switch input 104 with a delay that is set in dependence on the pitch period estimated by block 108. The switch 103 feeds the buffered data to the decoder 106 as a substitute for the corrupted packet comprising the error. The decoder decodes the buffered data and outputs a signal which is used as the decoded output for the corrupted packet. The decoder 106 is left holding an internal state suitable for decoding the next packet of encoded data. This method uses the signal directly output from the decoder as the decoded output for the degraded packet. A problem with this is that the direct output from the decoder often contains undesirable artefacts.

There is thus a need for an improved method of decoding a data stream comprising degraded packets that efficiently updates the state of the decoder when processing a degraded packet without reducing the quality of the decoded output for the degraded packet.

SUMMARY OF THE DISCLOSURE

According to a first aspect of the disclosure there is provided a method of decoding portions of a data stream, each portion comprising a plurality of samples, the method comprising: storing portions of the data stream; decoding portions of the data stream to form decoded portions; storing the decoded portions; identifying that a portion of the data stream is degraded; and following identifying that a portion of the data stream is degraded: (a) generating a decoded portion for the degraded portion of the data stream using the stored decoded portions; and (b) updating a state of a decoder by: estimating a pitch period of the degraded portion; selecting a group of successive samples of the stored portions of the data stream, the group of successive samples offset from the degraded portion in the data stream by a multiple of the estimated pitch period; and decoding the selected samples at the decoder.

Suitably, the method comprises estimating a pitch period of the degraded portion by estimating the pitch period of at least one portion of the data stream that is proximal in time to the degraded portion of the data stream.

Suitably, the method comprises estimating a pitch period of the degraded portion by estimating a pitch period of a portion of the data stream that precedes or follows the degraded portion of the data stream.

Suitably, the method comprises estimating a pitch period of the degraded portion by estimating a pitch period of a portion of the data stream that precedes the degraded portion of the data stream and a portion of the data stream that follows the degraded portion of the data stream.

Suitably, the method comprises estimating the pitch period of at least one portion of the data stream that is proximal in time to the degraded portion of the data stream by estimating the pitch period of at least one stored portion of the data stream.

Suitably, the method comprises estimating the pitch period of at least one portion of the data stream that is proximal in time to the degraded portion of the data stream by estimating the pitch period of at least one stored decoded portion formed by decoding the at least one portion of the data stream.

Suitably, the method further comprises identifying that a portion of the data stream is not degraded, the method further comprising forming a decoded output for the portions of the data stream by: following identifying that a portion of the data stream is degraded, selecting the generated decoded portion for that degraded portion to form the decoded output; and following identifying that a portion of the data stream is not degraded, selecting the decoded portion for that non-degraded portion to form the decoded output.

Suitably, the method further comprises, after identifying that a portion of the data stream is degraded: inhibiting the decoder from decoding the degraded portion; and enabling a concealment module to generate the decoded portion for the degraded portion of the data stream and to perform the estimating and selecting steps of updating the state of the decoder.

Suitably, the method comprises generating a decoded portion for the degraded portion of the data stream using the stored decoded portions by: selecting a sample of the stored decoded portions formed by decoding a portion of the data stream that precedes or follows the degraded portion by a multiple of the estimated pitch period; and forming the decoded portion for the degraded portion of the data stream from the selected sample and samples successive to the selected sample.

Suitably, the method comprises, if the estimated pitch period is greater than or equal to the length of the portions of the data stream, selecting successive samples separated from the degraded portion in the data stream by the estimated pitch period.

Suitably, the method comprises, if the estimated pitch period is less than the length of the portions of the data stream, selecting successive samples separated from the degraded portion in the data stream by the smallest multiple of the estimated pitch period that is greater than or the same as the length of the portions of the data stream.

According to a further aspect of the disclosure, there is provided a decoding apparatus for decoding portions of a data stream, each portion comprising a plurality of samples, the decoding apparatus comprising: a first buffer configured to store portions of the data stream; a decoder configured to decode portions of the data stream to form decoded portions; a second buffer configured to store the decoded portions; a degradation detector configured to identify that a portion of the data stream is degraded; a replacement module configured, following identification that a portion of the data stream is degraded, to generate a decoded portion for the degraded portion of the data stream using the stored decoded portions; a pitch period estimation module configured, following identification that a portion of the data stream is degraded, to estimate a pitch period of the degraded portion; and a sample selecting module configured, following identification that a portion of the data stream is degraded, to select successive samples of the stored portions of the data stream, the successive samples separated from the degraded portion in the data stream by a multiple of the estimated pitch period; wherein the decoder is further configured, following identification that a portion of the data stream is degraded, to decode the selected samples.

Suitably, the apparatus further comprises a switch configured to connect and disconnect the data stream to the decoder, the switch being controllable by the degradation detector so as to inhibit the decoder from decoding the degraded portion.

BRIEF DESCRIPTION OF THE DRAWINGS

The present disclosure will now be described by way of example with reference to the accompanying drawings. In the drawings.

DETAILED DESCRIPTION

Figure 1:
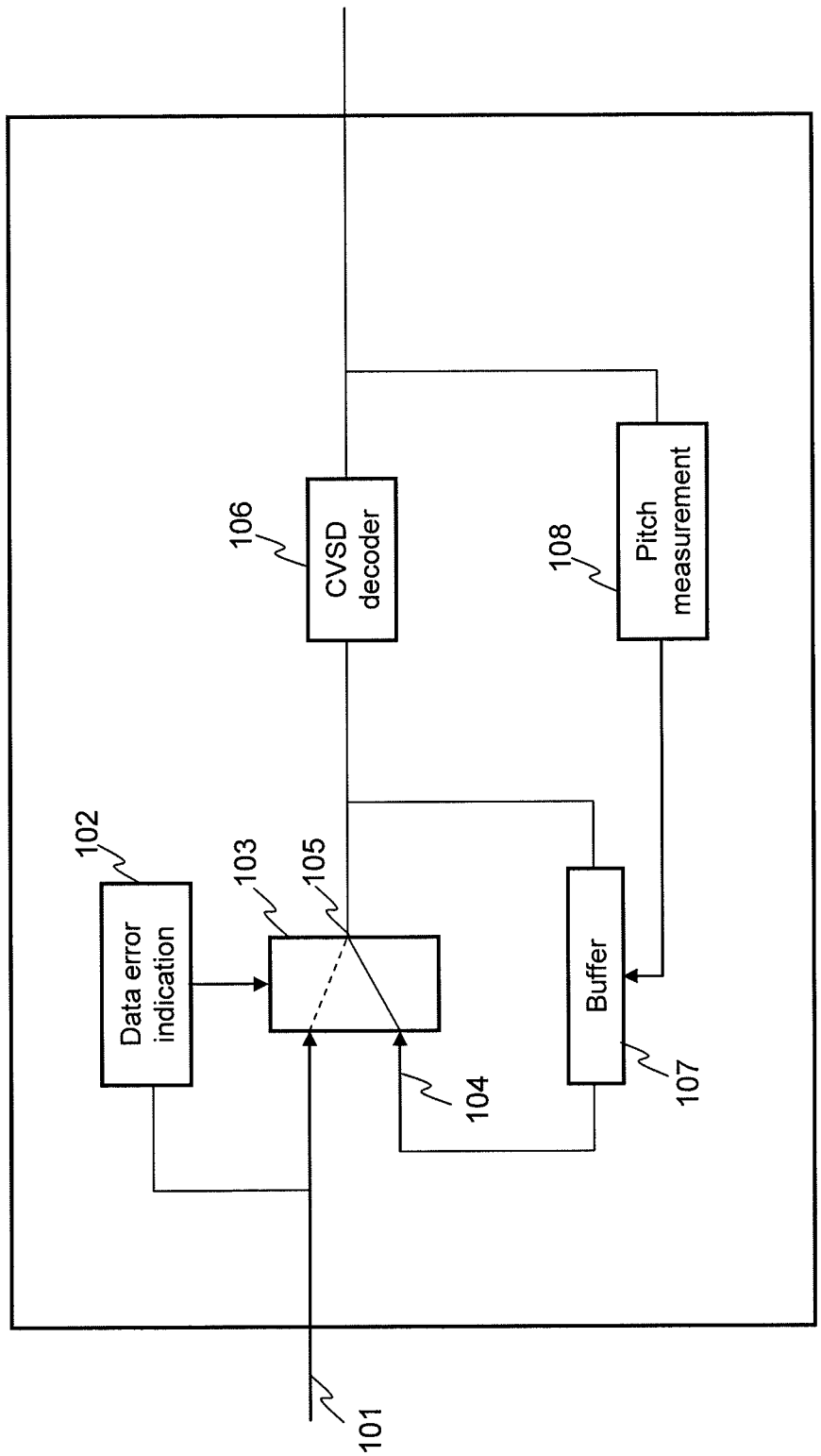
FIG. 1 is a schematic diagram of a prior art decoding apparatus.
Figure 2A:
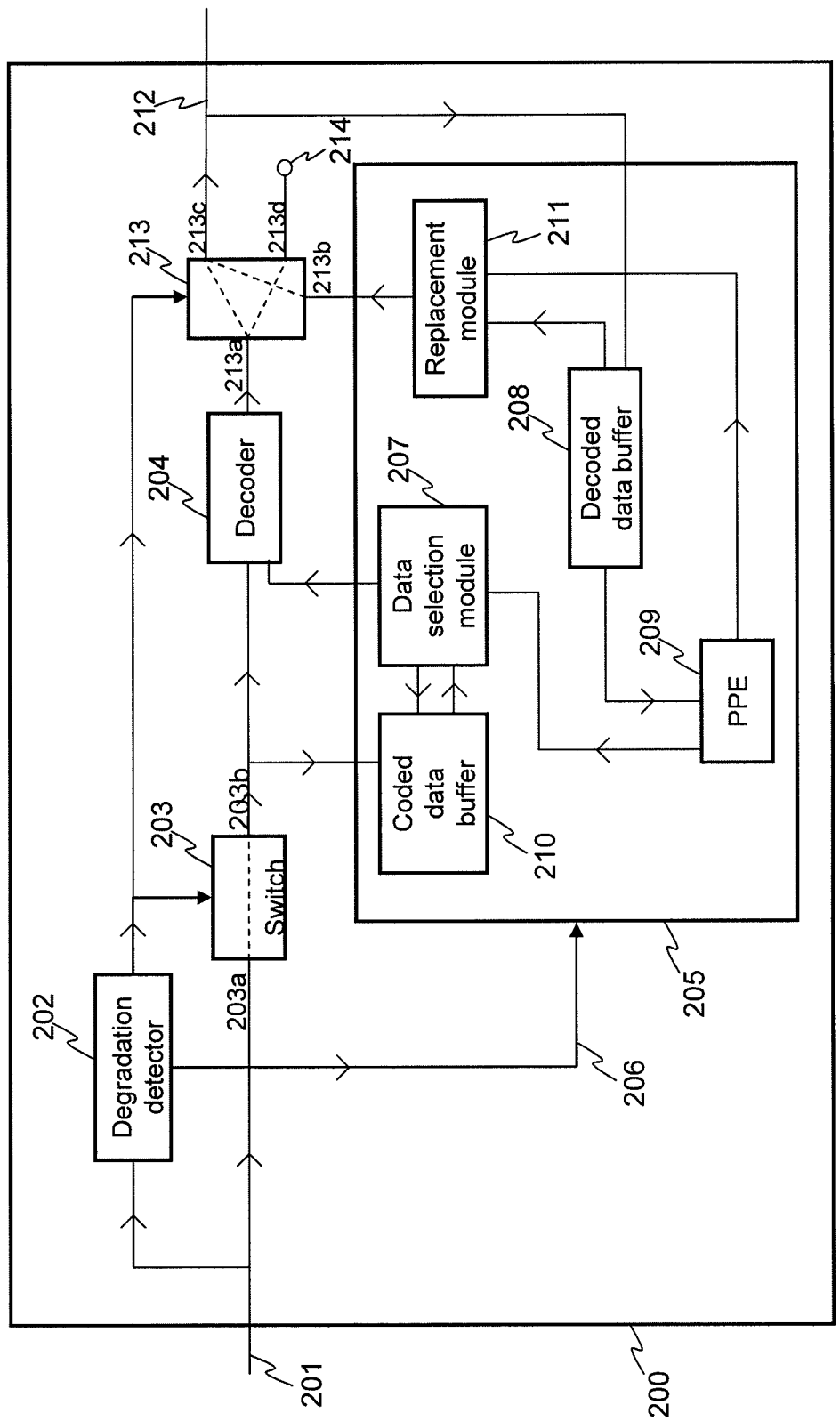
FIG. 2a is a schematic diagram of a decoding apparatus according to the present disclosure.

FIG. 2a shows a schematic diagram of the general arrangement of a decoding apparatus. On FIG. 2a (and FIG. 2b), solid arrows terminating at a module indicate control signals. Other arrows indicate the direction of travel of signals between the modules.

An encoded data stream is input to the decoding apparatus 200 on line 201. Line 201 is connected to an input of degradation detector 202. A first control output of degradation detector 202 is connected to a control input of switch 203. Line 201 is connected to a further input 203a of switch 203. An output 203b of switch 203 is connected to a first input of decoder 204. A first output of decoder 204 is connected to a first input 213a of switch 213. A second control output of degradation detector 202 is connected to a control input of switch 213. A first output 213c of switch 213 is connected to an output of the decoding apparatus 200 on line 212. A second output 213d of switch 213 is connected to a sink node 214. The decoding apparatus further comprises a degradation concealment module 205. A third control output of degradation detector 202 is connected to a control input of degradation concealment module 205 on line 206. Degradation concealment module 205 comprises a data selection module 207, a decoded data buffer 208, a pitch period estimation module 209, a coded data buffer 210 and a replacement module 211. The output 203b of switch 203 is further connected to a first input of coded data buffer 210. An output of coded data buffer 210 is connected to a first input of data selection module 207. A first output of data selection module 207 is connected to a second input of coded data buffer 210. A second output of data selection module 207 is connected to a second input of decoder 204. The first output 213c of switch 213 on line 212 is connected to an input of decoded data buffer 208. A first output of decoded data buffer 208 is connected to an input of the pitch period estimation module 209. A second output of decoded data buffer 208 is connected to a first input of replacement module 211. A first output of pitch period estimation module 209 is connected to a second input of data selection module 207. A second output of pitch period estimation module 209 is connected to a second input of replacement module 211. An output of replacement module 211 is connected to a third input 213b of switch 213.

In operation, signals are processed by the decoding apparatus of FIG. 2a in discrete temporal parts. The following description refers to processing packets of data, however the description applies equally to processing frames of data or any other suitable portions of data. These portions of data are generally of the order of a few milliseconds in length.

The apparatus of FIG. 2a is suitable for decoding an encoded data stream in the form of a voice signal. Each packet of the voice signal is sequentially input into the decoding apparatus 200 on line 201. Each packet is input to the degradation detector 202. For each packet, the degradation detector 202 determines whether to generate a decoded output from the decoding apparatus by decoding the packet on line 201 or by generating a replacement packet using the degradation concealment module 205.

Some communication protocols provide coding mechanisms for error detection and/or error correction, for example cyclic redundancy checks (CRC). If the decoding apparatus 200 is operating in accordance with such a protocol, the degradation detector 202 may use the error detection and/or error correction method of the protocol in its determination of whether to decode the packet or generate a replacement packet.

If the decoding apparatus 200 is operating in accordance with a protocol that does not provide a coding mechanism for error detection and/or error correction, then the degradation detector 202 may base its determination of whether to decode the packet or generate a replacement packet on the error rate of the received data. For example, the degradation detector 202 measures the error rate of the received packet. If the error rate is lower than a threshold value then the degradation detector determines that the packet is not degraded and is to be decoded using the decoder 204. However, if the error rate is higher than the threshold value then the degradation detector determines that the packet is degraded and that the degradation concealment module 205 is to be used to generate a decoded output for the degraded packet. The threshold error value may be predetermined. Alternatively, the threshold error value may be dynamically determined during receipt of the signal. The use of determining the error rate of the received data as described here may be used even if the communication protocol allows for error detection and/or error correction.

The apparatus and method described herein are suitable for implementation in Bluetooth devices. Some Bluetooth packet types include a CRC after the packet payload that is used to detect most of the errors in the received packet. However, CRC is limited in that if there are errors in a packet it can only indicate that there are errors in the packet: it provides no information on the location of the errors or on the degree of degradation. A packet is also degraded if it has been lost before or on reception at the receiver. In Bluetooth, packets comprise a header portion preceding the payload portion. A Header Error Check (HEC) is performed on the header. This is an 8-bit CRC. The packet is discarded on reception at the receiver if its header check fails.

If the packet is not degraded, then the degradation detector 202 outputs a control signal to switch 203 which controls the switch 203 to connect input 203a to output 203b, thereby passing the packet on line 201 through to decoder 204. Additionally, the degradation detector 202 outputs a second control signal to switch 213 which controls the switch 213 to connect input 213a to output 213c, thereby connecting the output of the decoder 204 to the output of the decoding apparatus 200 on line 212. If the packet is not degraded then the degradation detector 202 does not control the degradation concealment module 205 to generate a replacement packet or to update the decoder state.

If the packet is degraded, then the degradation detector 202 outputs a control signal on line 206 to the degradation concealment module 205 controlling it to generate a replacement packet and update the state of the decoder. If the packet is degraded then the degradation detector 202 does not control the switch 203 to connect input 203a to output 203b. The degraded packet is therefore not connected to decoder 204. In this case, the degradation detector 202 controls the switch 213 to connect input 213b to output 213c, thereby connecting the output of the degradation concealment module 205 to the output of the decoding apparatus 200 on line 212. Additionally, the degradation detector 202 controls the switch 213 to connect input 213a to output 213d, thereby connecting the output of the decoder to the sink node 214.

If the packet is not degraded then the switch 203 switches the packet through to the first input of coded data buffer 210 where it is stored. Switch 203 also switches the packet through to the first input of decoder 204. The decoder 204 decodes the packet using the appropriate coding scheme and outputs the decoded packet to switch 213. Switch 213 receives the decoded packet at input 213a and outputs it from output 213c on line 212. The decoded packet on line 212 is input to decoded data buffer 208 where it is stored. This decoded packet is also output from the decoding apparatus 200 as the decoded output. As a result of decoding the packet, the decoder is left holding the correct state required to decode the next packet of data.

If the packet is degraded then the switch 203 is not enabled by the control input from degradation detector 202 to connect input 203a to output 203b. Consequently, the degraded packet is not passed through decoder 204. The degradation detector 202 outputs a control signal on line 206 that enables the degradation concealment module 205 to generate a replacement decoded packet for the degraded packet and to update the state of the decoder. This control signal enables decoded data buffer 208 to output the most recently decoded packet or packets (or replacement packet or packets) to the pitch period estimation module 209. Suitably, the decoded data buffer 208 outputs the decoded packet that was formed by decoding the packet that immediately precedes the degraded packet in the coded data stream. Alternatively, the decoded data buffer outputs a decoded packet that was formed by decoding a packet that is offset from the degraded packet in the coded data stream by a short time interval. If delay or latency is not of a primary concern, then it is advantageous for the decoded data buffer to output a decoded packet that was formed by decoding a packet that follows (either immediately or by a short time period) the degraded packet in the coded data stream. Suitably, the decoded data buffer outputs a decoded packet or packets that was or were formed by decoding a packet or packets that precede (either immediately or by a short time period) the degraded packet in the data stream, and the decoded data buffer also outputs a decoded packet or packets that was or were formed by decoding a packet or packets that follow (either immediately or by a short time period) the degraded packet in the data stream. The pitch period estimation module 209 estimates the pitch period of the packet or packets it receives.

The purpose of the pitch period estimation module 209 is to estimate the pitch period of the degraded packet. The pitch period of a degraded voice packet will normally be substantially the same as the pitch period of the packets on either side of the degraded voice packet. A good estimate of the pitch period of the degraded packet is therefore obtainable by estimating the pitch period of the packet or packets surrounding the degraded packet. A more accurate estimate of the pitch period of the degraded packet is obtained by estimating the pitch period of data from both before and after the degraded packet in the data stream, i.e. by using both a packet (or packets) preceding the degraded packet and a packet (or packets) following the degraded packet in the data stream. However, using packets that follow the degraded packet in the data stream introduces a delay or latency into the decoding apparatus and therefore is not always appropriate.

Figure 2B:
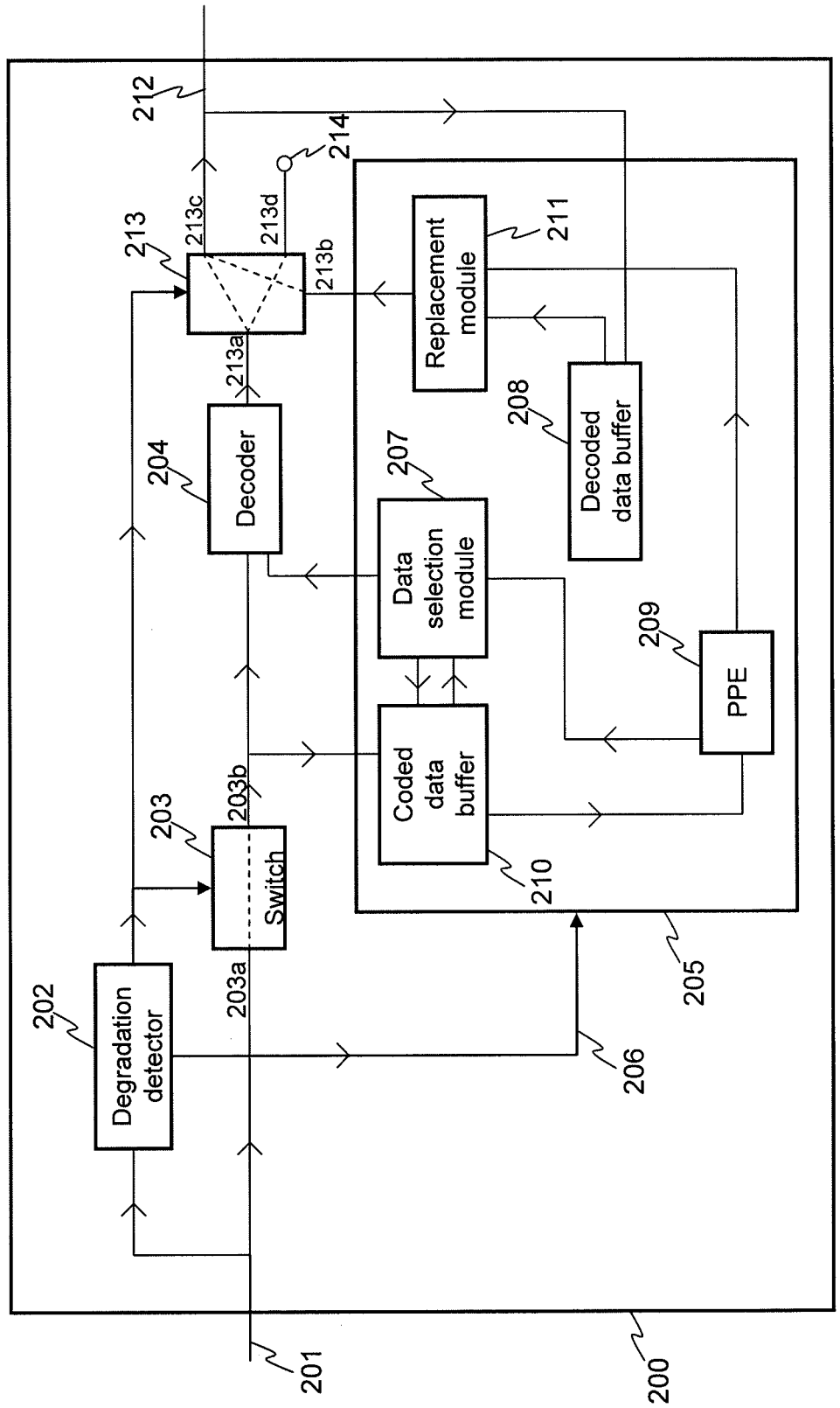
FIG. 2b is a schematic diagram of a further decoding apparatus according to the present disclosure.

As an alternative, the pitch period estimation module 209 could estimate the pitch period of the encoded packet or packets before they are decoded by the decoder 204. This is illustrated in FIG. 2b. FIG. 2b is the same as FIG. 2a except that the output from the decoded data buffer 208 that is connected to an input of the pitch period estimation module 209 has been replaced by an output from the coded data buffer 210 that is connected to an input of the pitch period estimation module 209. In this case, the control signal output by the degradation detector 202 enables coded data buffer 210 to output the most recently received packet or packets (or replacement packet or packets) to the pitch period estimation module 209. As with FIG. 2a, this packet or packets may have preceded, followed or both preceded and followed the degraded packet in the data stream. The pitch period estimation module 209 estimates the pitch period of the packet or packets it receives from the coded data buffer 210. It may not be possible to estimate the pitch period directly using the encoded packets of the data stream. For example, if the Bluetooth CVSD codec is used, the encoded data stream consists of binary symbols. The data stream must first be transformed (for example by convolution with a specific filter) into a signal that has a waveform similar to speech. A pitch period estimation of this transformed signal may then be performed. The transformation used is codec dependent. In the particular example of the CVSD codec, the transformation is on the encoded bit stream after resampling.

Many methods may be used to estimate the pitch period of a voice signal. Generally speaking, these methods include use of a normalized cross-correlation (NCC) method. Such a method can be expressed mathematically as:

$$NCC_t(\tau) = \frac{\sum_{n=-N/2}^{(N/2)-1} x[t+n]x[t+n-\tau]}{\sqrt{\sum_{n=N/2}^{(N/2)-1} x^2[t+n] \sum_{n=-N/2}^{(N/2)-1} x^2[t+n-\tau]}} \quad \text{(equation 1)}$$

where x is the amplitude of the voice signal and t is time. The equation represents a correlation between two segments of the voice signal which are separated by a time $\tau$. Each of the two segments is split up into N samples. The nth sample of the first segment is correlated against the respective nth sample of the other segment.

Figure 3:
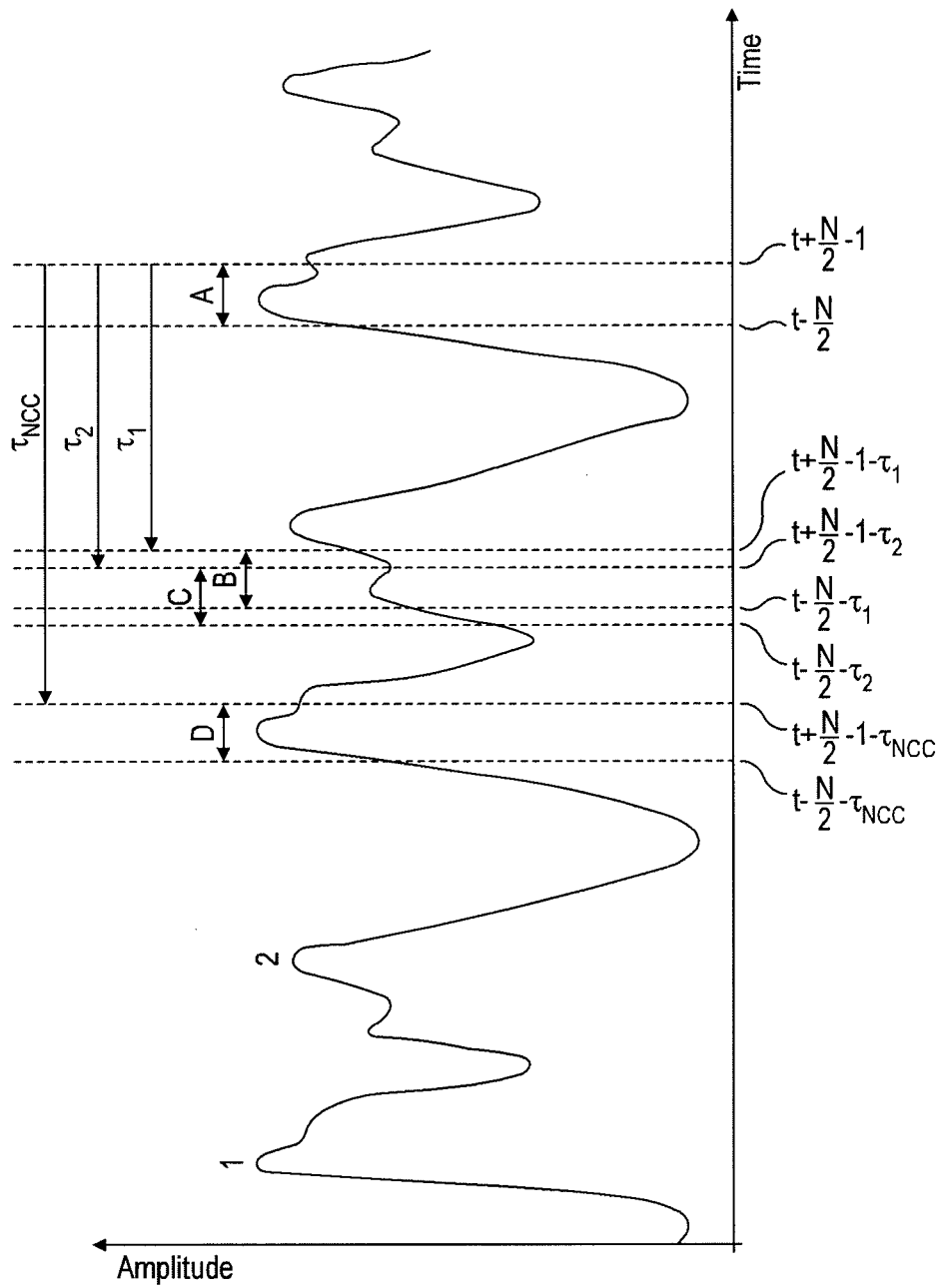
FIG. 3 is a graph of a typical voice signal illustrating a cross-correlation method.

This equation essentially takes a first segment of a signal (marked A on FIG. 3) and correlates it with each of a number of further segments of the signal (for ease of illustration only three, marked B, C and D, are shown on FIG. 3). Each of these further segments lags the first segment along the time axis by a lag value ($\tau_1$ for segment B, $\tau_2$ for segment C). The calculation is carried out over a range of lag values within which the pitch period of the voice signal is expected to be found. The term on the bottom of the fraction in equation 1 is a normalizing factor. The lag value $\tau_{NCC}$ that maximizes the NCC function represents the time interval between the segment A and the segment with which it is most highly correlated (segment D on FIG. 3). This lag value $\tau_{NCC}$ is taken to be the pitch period of the signal.

The pitch period estimation module 209 outputs the estimated pitch period to the replacement module 211. The replacement module 211 selects decoded data from the decoded data buffer 208 in dependence on the estimated pitch period. The selected decoded data is used to form a decoded replacement for the degraded packet. The replacement module 211 outputs the decoded replacement packet to input 213b of switch 213. Switch 213 is enabled under the control of degradation detector 202 to connect input 213b to output 213c thereby outputting the decoded replacement packet on line 212 for output from the decoding apparatus 200 as the decoded output for the degraded packet. The decoded replacement packet on line 212 is input to decoded data buffer 208 where it is stored.

Suitably, the replacement module 211 performs a pitch-based waveform substitution. Suitably, this involves generating a waveform at the pitch period estimated by the pitch period estimation module 209. The waveform (or repeats of the waveform) is used as a replacement decoded output for the degraded packet. If the degraded packet is shorter than the estimated pitch period, then the generated waveform is a fraction of the length of the estimated pitch period. Suitably, the generated waveform is slightly longer than the degraded packet, such that it overlaps with the packets on either side of the degraded packet. The overlaps are advantageously used to fade the generated waveform of the degraded packet into the received signal on either side thereby achieving smooth concatenation.

The replacement module 211 generates the waveform using the decoded data stored sequentially in the decoded data buffer 208. This decoded data includes data decoded by the decoder 204 and replacement data generated by the degradation concealment module 205. Advantageously, the decoded data buffer 208 has a longer length (stores more samples) than the maximum pitch period (measured in samples). The replacement module counts back sequentially, from the most recently received sample in the decoded data buffer, by a number of samples equal to the estimated pitch period. The sample that the replacement module counts back to is taken to be the first sample of the generated waveform. The replacement module 211 takes sequential samples up to the number of samples that are in the degraded packet. The resulting selected group of samples is taken to be the generated waveform. For example, if the decoded data buffer has a length of 200 samples (with the 200$^{th}$ sample being the most recently received), the estimated pitch period is determined to have a length of 50 samples and the degraded packet has a length of 30 samples, then the replacement module 211 generates a waveform containing samples 151 to 180 of the decoded data buffer. As mentioned in the above paragraph, extra samples may be selected from the buffer or generated by the replacement module to achieve smoothing effects at the concatenation points.

If the degraded packet is longer than the estimated pitch period, then a group of samples equal to the length of the estimated pitch period is selected (in the above example this would be samples 151 to 200). This set of samples is repeated and used as the generated waveform for use as the replacement decoded output of the degraded packet. Alternatively, a set of samples equal to the length of the degraded packet is selected from the decoded data buffer 208. This is achieved by counting back sequentially in the decoded data buffer, from the most recently received sample, by a number of samples equal to a multiple of the estimated pitch period. The multiple is chosen such that the number of samples counted back is longer than or equal to (no shorter than) the length of the degraded packet. Typically the multiple will be 2 or 3 times the estimated pitch period. If the degraded packet is shorter than the estimated pitch period, then the multiple is 1. The sample that the replacement module counts back to is taken to be the first sample of the generated waveform. The replacement module 211 takes sequential samples up to the number of samples that are in the degraded packet. The resulting selected group of samples is taken to be the generated waveform. For example, if the decoded data buffer has a length of 200 samples, the estimated pitch period is determined to have a length of 50 samples and the degraded packet has a length of 60 samples, then the replacement module 211 generates a waveform containing samples 101 to 160 of the decoded data buffer. As previously mentioned, extra samples may be selected from the buffer or generated by the replacement module to achieve smoothing effects at the concatenation points.

In the above description, the replacement module 211 selects data from the decoded data buffer 208 that was formed from packets in the data stream that preceded the degraded packet. As in the discussion of estimating the pitch period, it may be advantageous to select data from the decoded data buffer 208 that was formed from packets in the data stream that followed the degraded packet. As with the above description, the selected group of successive samples is offset from the degraded packet by a multiple of the estimated pitch period (for example the multiple may be 1, 2 or 3). In order to determine whether to generate the replacement waveform using samples preceding the degraded packet or using samples following the degraded packet, a group of samples from either side of the degraded packet may be compared and on the basis of that comparison the most appropriate group is selected for generating the replacement waveform. For example, the mismatch at the concatenation boundary with the surrounding packets may be evaluated for each of the two groups. In this example, the group with the smaller mismatch would be selected for use in generating the replacement waveform. As a further alternative, it may be advantageous to combine a group of samples preceding the degraded packet with a group of samples following the degraded packet. For example, the average of the two groups of samples could be used in generating the replacement waveform. This alternative would be appropriate, for example, when the two groups of samples are synchronized in phase and the signal has increasing or decreasing amplitude.

Alternatively, other known pitch based waveform substitution techniques utilizing the estimated pitch period may be used by the replacement module 211.

The pitch period estimation module 209 also outputs the estimated pitch period to the data selection module 207. In dependence on the estimated pitch period, the data selection module selects data from the coded data buffer 210 to pass to the decoder 204. Coded packets of the data stream are stored sequentially in the coded data buffer 210. These coded packets each comprise a plurality of samples. The data selection module selects a group of successive samples from the coded data buffer 210. Advantageously, the coded data buffer 210 has a longer length (stores more samples) than the maximum pitch period (measured in samples).

If the degraded packet is shorter than the estimated pitch period, then the data selection module 207 counts back sequentially, from the most recently received sample in the coded data buffer, by a number of samples equal to the estimated pitch period. The sample that the data selection module 207 counts back to is the first sample of the group of successive samples to be selected. The data selection module 207 forms the group of successive samples by taking sequential samples up to the number of samples that are in the degraded packet. For example, if the coded data buffer has a length of 200 samples (with the 200$^{th}$ sample being the most recently received), the estimated pitch period is determined to have a length of 50 samples and the degraded packet has a length of 30 samples, then the data selection module 207 forms a group of successive samples containing samples 151 to 180 of the coded data buffer.

If the degraded packet is longer than the estimated pitch period, then a set of samples equal to the length of the degraded packet is selected from the coded data buffer 210. This is achieved by counting back sequentially in the coded data buffer, from the most recently received sample, by a number of samples equal to a multiple of the estimated pitch period. The multiple is chosen such that the number of samples counted back is longer than or equal to (no shorter than) the length of the degraded packet. Typically the multiple will be 2 or 3 times the estimated pitch period. If the degraded packet is shorter than the estimated pitch period, then the multiple is 1. The sample that the data selection module 207 counts back to is taken to be the first sample of the group of successive samples. The data selection module 207 takes sequential samples up to the number of samples that are in the degraded packet. The resulting selected group of samples is taken to be the group of successive samples. For example, if the coded data buffer has a length of 200 samples, the estimated pitch period is determined to have a length of 50 samples and the degraded packet has a length of 60 samples, then the data selection module 207 forms a group of successive samples containing samples 101 to 160 of the coded data buffer.

The data selection module outputs the selected group of successive samples to the decoder 204. The decoder 204 decodes the group of successive samples. The decoder 204 is consequently left holding a state that it held after decoding data that preceded (or followed) the degraded packet by a multiple of the pitch period in the data stream. Since such data is a suitable replacement for the degraded packet, the decoder is left holding the same state or a similar state to the state it would have held after decoding the degraded packet had the degraded packet been received without degradation. In other words, the decoder state is implicitly updated by decoding the group of successive samples. The decoder uses the updated decoder state in decoding the next packet of encoded data after the degraded packet. The data selection module 207 also outputs the selected group of successive samples back to the coded state buffer 210. The coded state buffer 210 stores the group of successive samples sequentially in a position corresponding to that of the degraded packet. This is at a position corresponding to the position at which the replacement decoded packet is stored in the decoded data buffer 208. Both the group of successive samples and the replacement decoded packet are therefore used by the degradation concealment module 205 in handling future degraded packets in the same manner as data that has been decoded by the decoder and non-degraded coded data that has been stored in buffer 210.

The group of successive samples are decoded by the decoder 204 to form a group of decoded samples. These decoded samples are output to the switch 213. Under the control of degradation detector 202, then switch 213 connects input 213a to output 213d. This causes the decoded samples to be passed to a sink node 214 where they are discarded. The group of decoded samples are not output from the decoding apparatus as the decoded output for the degraded packet.

Data may be stored in coded data buffer 210 and decoded data buffer 208 in different formats. As an example, consider the use of a Bluetooth CVSD codec with a packet length (L) of 240 bits. A bluetooth CVSD codec is sampled at 64 kHz and the input and output packet concealment waveform is sampled at 8 kHz. Consequently, resampling is required prior to the CVSD encoder at the transmitting end of the communication and after the CVSD decoder at the receiving end of the communication. The pitch period estimation module 209 estimates the pitch period of the 8 kHz decoded data from the decoded data buffer 208 or alternatively estimates the pitch period of the encoded data from the coded data buffer 210. Consider the case where the pitch period is estimated to be:

$$P_{decoded} = 60 \text{ samples} \quad \text{(equation 2)}$$

This corresponds to a pitch period of:

$$P_0 = 60 \times 8 = 480 \text{ bits} \quad \text{(equation 3)}$$

The decoded data buffer is usually in pulse code modulation form. Counting back from the end of the buffer which has a length of 200 samples (with the 200$^{th}$ sample being the most recently received), the replacement module selects samples 141 to 170 to use to form a replacement waveform for the degraded packet. The coded data buffer is usually in bit form. This has a corresponding length of 1600 bits. The data selection module selects encoded bits from 1121 to 1360 (with the 1600$^{th}$ sample being the most recently received) to pass through the decoder.

Figure 4:
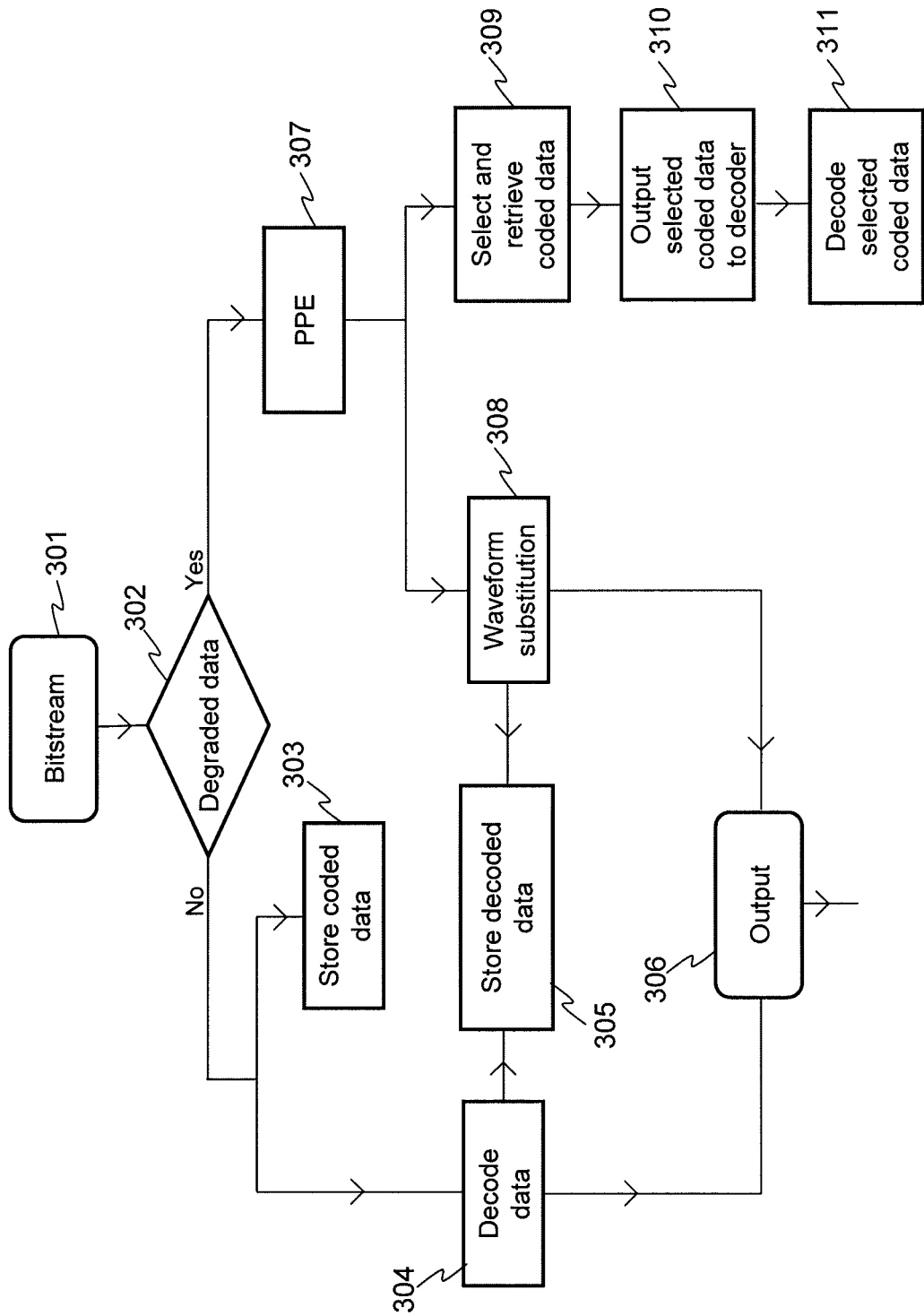
FIG. 4 is a flow chart of a decoding method according to the present disclosure.

FIG. 4 shows a flow chart of the above described method. At step 301, the voice packet enters the decoding apparatus. At step 302 the degradation detector determines whether the packet is degraded. If the packet is not degraded, then the packet is stored at step 303 and decoded at step 304. The decoded data is stored at step 305. The decoded data is output from the decoding apparatus at step 306. If the packet is degraded, then the pitch period of the preceding/following/preceding and following packet or packets is estimated at step 307. Pitch-based waveform substitution is performed at step 308 to produce a replacement decoded waveform which is stored at step 305 and output from the decoding apparatus at step 306. The coded data is selected and retrieved by the data selection module from the coded data buffer at step 309 and passed to the decoder at step 310. The decoder decodes the selected data at step 311.

FIG. 2a and FIG. 2b are schematic diagrams of the decoding apparatus described herein. The method described does not have to be implemented at the dedicated blocks depicted in these figures. The functionality of each block could be carried out by another one of the blocks described or using other apparatus. For example, the method described herein could be implemented partially or entirely in software.

The method described is useful for packet loss/error concealment techniques implemented in wireless voice or VoIP communications. The method is particularly useful for products such as Bluetooth and Wi-Fi products that involve applications with coded audio processing capability such as music streaming and hands-free phone calls.

Figure 5:
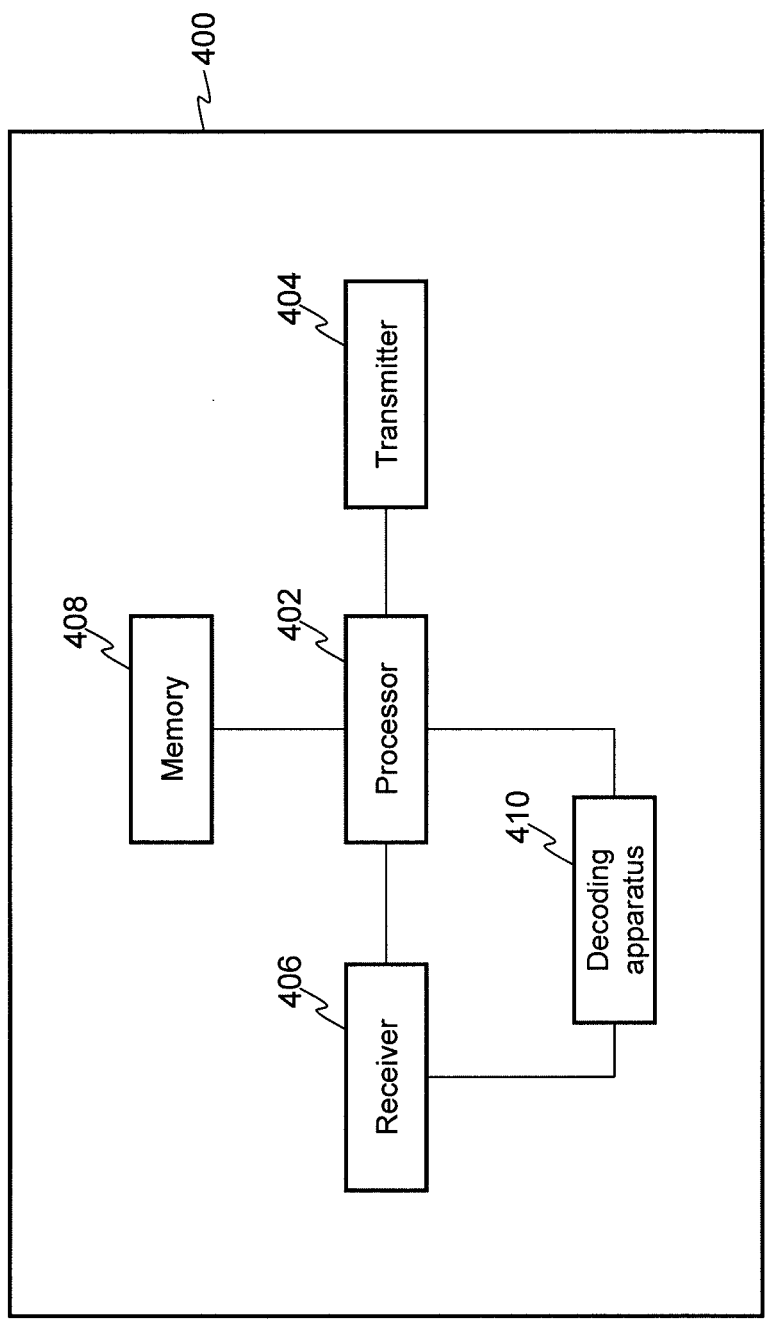
FIG. 5 is a schematic diagram of a transceiver suitable for comprising the decoding apparatus of FIG. 2a or FIG. 2b.

The pitch period estimation apparatus of FIGS. 2a and 2b could usefully be implemented in a transceiver. FIG. 5 illustrates such a transceiver 400. A processor 402 is connected to a transmitter 404, a receiver 406, a memory 408 and a decoding apparatus 410. Any suitable transmitter, receiver, memory and processor known to a person skilled in the art could be implemented in the transceiver. Preferably, the decoding apparatus 410 comprises the apparatus of FIG. 2a or FIG. 2b. The decoding apparatus is additionally connected to the receiver 406. The signals received and demodulated by the receiver may be passed directly to the decoding apparatus for decoding. Alternatively, the received signals may be stored in memory 408 before being passed to the decoding apparatus. The transceiver of FIG. 5 could suitably be implemented as a wireless telecommunications device. Examples of such wireless telecommunications devices include headsets, desktop speakers and handheld mobile phones.

A problem addressed by this disclosure is the need to provide a decoded output for a degraded packet in a data stream whilst leaving the decoder holding a suitable state to decode the next received packet of the data stream. A prior system addresses this problem by buffering data received prior to a corrupted packet, and on reception of a corrupted packet selecting a segment of the buffered data (in dependence on an estimated pitch period), and feeding this buffered data through the decoder. The decoded buffered data is used as the decoded output for the corrupted packet, and the state of the decoder is inherently updated to a suitable state for decoding the next received packet of the data stream. However, the direct output of the decoder may contain artefacts at the boundaries between the decoded buffered data used as the decoded output for the corrupted packet and the adjacent non-degraded decoded packets. The method and apparatus described herein solve this problem as follows. Following identification that a degraded packet has been received, the state of the decoder is updated by selecting stored coded data offset from the degraded packet by a multiple of the estimated pitch period of the degraded packet and decoding this data at the decoder. Unlike the prior system described, the degraded packet replacement mechanism is not limited to using the output of the decoder as the decoded output for the degraded packet. The decoded data is not used further in the described method. The decoded data may be discarded or used for another tangential purpose. The decoded output for the degraded packet is formed using previously decoded packets of the data stream which have been stored. These decoded packets are stored in the PCM domain. This is advantageous because a more sophisticated waveform substitution can be employed. For example overlap-add or cross-fading can be carried out at the concatenation points so as to smooth the addition of the substitute packet to the decoded data stream and reduce artefacts in the decoded output. A better quality decoded output is therefore provided by the method and apparatus described herein.

The method described herein provides, following identification of a degraded portion of a data stream, a decoded output for the degraded portion and also provides for updating the state of the decoder such that it is in a suitable state to decode the next portion of the data stream. The method is suitable for use in packet loss/error concealment systems. The procedure significantly reduces artefacts and improves the packet loss/error concealment performance at high packet loss rates. The method is simple to implement and highly configurable. Unlike many prior systems, this is not a codec-specific method. The method described is independent of the codec used and hence can easily be ported to new codec platforms. Additionally, the method can be used in combination with a number of pitch period estimation algorithms.

The applicant draws attention to the fact that the present disclosure may include any feature or combination of features disclosed herein either implicitly or explicitly or any generalization thereof, without limitation to the scope of any of the present claims. In view of the foregoing description it will be evident to a person skilled in the art that various modifications may be made within the scope of the disclosure.

The invention claimed is:

1. A method of decoding encoded portions of a data stream at a decoding apparatus, each portion comprising a plurality of samples, the method comprising:
   at the decoding apparatus, receiving encoded portions of the data stream;
   storing the encoded portions of the data stream;
   decoding the encoded portions of the data stream to form decoded portions;
   storing the decoded portions;
   identifying that a portion of the data stream is degraded; and
   following identifying that a portion of the data stream is degraded:
      generating a decoded replacement portion for the degraded portion of the data stream using the stored decoded portions; and
      updating a state of a decoder using the encoded portions that were previously stored by:
         estimating a pitch period of the degraded portion;
         selecting, separate from the generation of the decoded replacement portion, a group of successive samples of the stored encoded portions of the data stream, wherein the group of successive samples offset from the degraded portion in the data stream by a multiple of the estimated pitch period, and wherein the selected samples are separate from the decoded replacement portion; and
      decoding the selected samples at the decoder, wherein the decoded selected samples are subsequently discarded.

2. The method as claimed in claim 1, further comprising estimating a pitch period of the degraded portion by estimating the pitch period of at least one encoded portion of the data stream that is proximal in time to the degraded portion of the data stream.

3. The method as claimed, in claim 2, further comprising estimating a pitch period of the degraded portion by estimating a pitch period of an encoded portion of the data stream that precedes or follows the degraded portion of the data stream.

4. The method as claimed in claim 2, further comprising estimating a pitch period of the degraded portion by estimating a pitch period of an encoded portion of the data stream that precedes the degraded portion of the data stream and an encoded portion of the data stream that follows the degraded portion of the data stream.

5. The method as claimed in claim 2, further comprising estimating the pitch period of at least one encoded portion of the data stream that is proximal in time to the degraded portion of the data stream by estimating the pitch period of at least one stored encoded portion of the data stream.

6. The method as claimed in claim 2, further comprising estimating the pitch period of at least one encoded portion of the data stream that is proximal in time to the degraded portion of the data stream by estimating the pitch period of at least one stored decoded portion formed by decoding the at least one encoded portion of the data stream.

7. The method as claimed in claim 1, further comprising identifying that an encoded portion of the data stream is not degraded, the method further comprising forming a decoded output for the encoded portions of the data stream by:
   following identifying that an encoded portion of the data stream is degraded, selecting the generated decoded replacement portion for that degraded portion to form the decoded output; and
   following identifying that an encoded portion of the data stream is not degraded, selecting the decoded portion for that non-degraded portion to form the decoded output.

8. The method as claimed in claim 1, further after identifying that an encoded portion of the data stream is degraded:
   inhibiting the decoder from decoding the degraded portion; and
   enabling a concealment module to generate the decoded replacement portion for the degraded portion of the data stream and to perform the estimating and selecting steps of updating the state of the decoder.

9. The method as claimed in claim 1, wherein generating a decoded portion for the degraded portion of the data stream using the stored decoded portions, further comprises:
   selecting a sample of the stored decoded portions formed by decoding an encoded portion of the data stream that precedes or follows the degraded portion by a multiple of the estimated pitch period; and
   forming the decoded replacement portion for the degraded portion of the data stream from the selected sample and samples successive to the selected sample, 10. The method as claimed in claim 1, further comprising, if the estimated pitch period is greater than or equal to the length of the encoded portions of the data stream, selecting successive samples separated from the degraded portion in the data stream by the estimated pitch period.

11. The method as claimed in claim 1, further comprising, if the estimated pitch period is less than the length of the encoded portions of the data stream, selecting successive samples separated from the degraded portion in the data stream by the smallest multiple of the estimated pitch period that is greater than or the same as the length of the encoded portions of the data stream.

12. The method as claimed in claim 1, further comprising identifying that the portion of the data stream is degraded based on an error rate of the encoded portions of the data stream.

13. A decoding apparatus for decoding encoded portions of a data stream, each portion comprising a plurality of samples, the decoding apparatus comprising:
- a receiver configured to receive encoded portions of the data stream;
- a first buffer configured to store the encoded portions of the data stream;
- a decoder configured to decode the encoded portions of the data stream to form decoded portions;
- a second buffer configured to store the decoded portions;
- a degradation detector configured to identify that a portion of the data stream is degraded;
- a replacement module configured, following identification that a portion of the data stream is degraded, to generate a decoded replacement portion for the degraded portion of the data stream using the stored decoded portions;
- a pitch period estimation module configured, following identification that a portion of the data stream is degraded, to estimate a pitch period of the degraded portion; and
- a sample selecting module configured, following identification that a portion of the data stream is degraded, to select, separate from the generation of the decoded replacement portion, successive samples of the stored encoded portions of the data stream, wherein the successive samples separated from the degraded portion in the data stream by a multiple of the estimated pitch period, and wherein the selected samples are separate from the decoded replacement portion;
- wherein the decoder is further configured, following identification that a portion of the data stream is degraded, to decode the selected samples, wherein the decoded selected samples are subsequently discarded.

14. The apparatus as claimed in claim 13, further comprising a switch configured to connect and disconnect the data stream to the decoder, the switch being controllable by the degradation detector so as to inhibit the decoder from decoding the degraded portion.

* * * * *